(12) United States Patent
Takeyama et al.

(10) Patent No.: US 11,226,210 B2
(45) Date of Patent: Jan. 18, 2022

(54) INFORMATION PROCESSING APPARATUS, OUTPUT METHOD, AND NON-TRANSITORY COMPUTER-READABLE RECORDING MEDIUM

(71) Applicant: Toyota Jidosha Kabushiki Kaisha, Toyota (JP)

(72) Inventors: Hiroaki Takeyama, Nisshin (JP); Motohiro Nakamura, Okazaki (JP); Norihiro Nakamura, Toyokawa (JP); Hideki Kasezawa, Okazaki (JP); Kensuke Takeuchi, Okazaki (JP); Hajime Morikawa, Nagoya (JP); Yoko Sakurai, Toyohashi (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 167 days.

(21) Appl. No.: 16/226,160

(22) Filed: Dec. 19, 2018

(65) Prior Publication Data
US 2019/0212166 A1 Jul. 11, 2019

(30) Foreign Application Priority Data
Jan. 10, 2018 (JP) .............................. JP2018-001846

(51) Int. Cl.
*G01C 21/36* (2006.01)
*G01C 21/32* (2006.01)
*G01C 21/34* (2006.01)

(52) U.S. Cl.
CPC .......... *G01C 21/3694* (2013.01); *G01C 21/32* (2013.01); *G01C 21/3415* (2013.01); *G01C 21/3614* (2013.01)

(58) Field of Classification Search
CPC ................ G01C 21/3694; G01C 21/32; G01C 21/3415; G01C 21/3614
(Continued)

(56) References Cited

U.S. PATENT DOCUMENTS

2008/0033639 A1* 2/2008 Nakamura ............. G01C 21/32
701/532
2011/0292030 A1 12/2011 Jiang et al.
(Continued)

FOREIGN PATENT DOCUMENTS

JP 2003-148976 A 5/2003
JP 2013-160529 A 8/2013
(Continued)

*Primary Examiner* — Yazan A Soofi
(74) *Attorney, Agent, or Firm* — Dinsmore & Shohl LLP

(57) ABSTRACT

An information processing apparatus includes an in-vehicle device mounted on a vehicle. The in-vehicle device includes a display device and a processor. The in-vehicle device outputs, on the display device, weather information of a point designated by a user on a map, displays a travel route along which the vehicle travels on the map on the display device, and in a case where the travel route is not included in the area including the point designated by the user on the map among a plurality of areas obtained by dividing the map and the processor determines that the point designated by the user is within a predetermined range from the travel route, outputs, on the display device, the weather information of an area closest to the point designated by the user among the areas including the travel route.

10 Claims, 9 Drawing Sheets

(58) Field of Classification Search
USPC .......................................................... 701/415
See application file for complete search history.

(56) References Cited

U.S. PATENT DOCUMENTS

| | | | | |
|---|---|---|---|---|
| 2012/0254804 | A1* | 10/2012 | Sheha | H04M 1/724 |
| | | | | 715/834 |
| 2013/0326407 | A1* | 12/2013 | van Os | G06F 3/04883 |
| | | | | 715/810 |
| 2013/0339891 | A1* | 12/2013 | Blumenberg | G01C 21/3694 |
| | | | | 715/771 |
| 2016/0356625 | A1* | 12/2016 | O'Beirne | G01C 21/367 |
| 2017/0192637 | A1* | 7/2017 | Ren | G01C 21/3694 |
| 2019/0204106 | A1* | 7/2019 | Lee | G01C 21/367 |
| 2020/0158516 | A1* | 5/2020 | Gale | G01C 21/32 |

FOREIGN PATENT DOCUMENTS

| | | |
|---|---|---|
| JP | 2016-521354 A | 7/2016 |
| WO | 2009/125463 A1 | 10/2009 |
| WO | 2014/161076 A1 | 10/2014 |

* cited by examiner

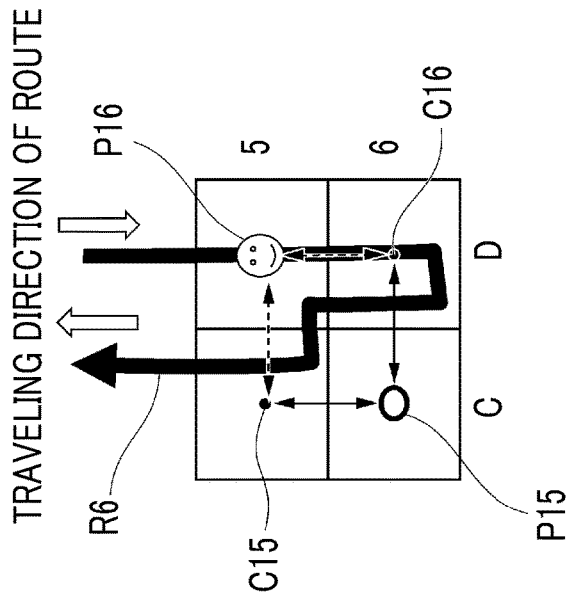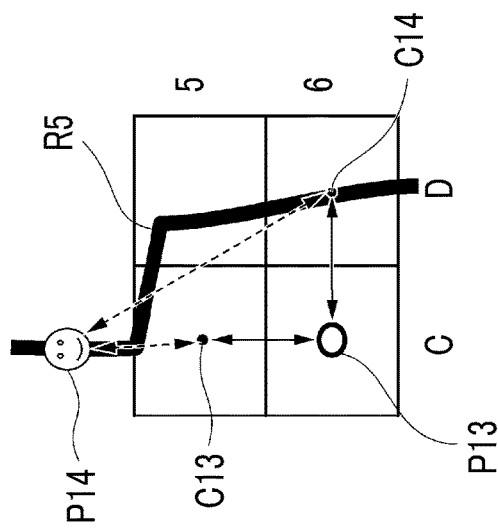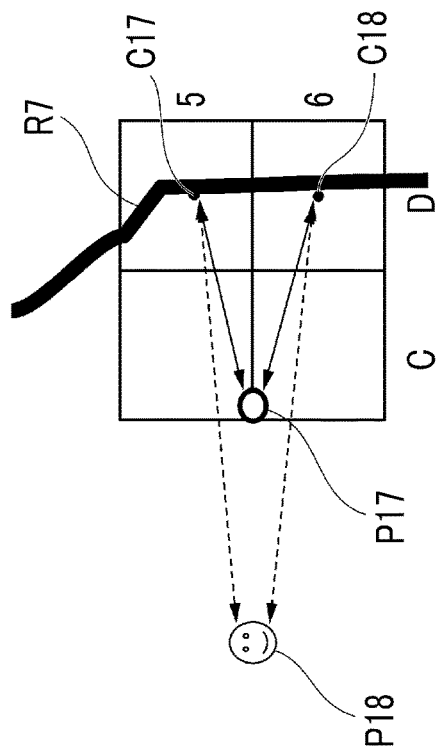

INFORMATION PROCESSING APPARATUS, OUTPUT METHOD, AND NON-TRANSITORY COMPUTER-READABLE RECORDING MEDIUM

CROSS-REFERENCE TO RELATED APPLICATION

This application claims priority to Japanese Patent Application No. 2018-001846 filed on Jan. 10, 2018, incorporated herein by reference in its entirety.

BACKGROUND

1. Technical Field

The present disclosure relates to an information processing apparatus, an output method, and a non-transitory computer-readable recording medium storing a program.

2. Description of Related Art

In car navigation devices mounted on vehicles, there is a car navigation device that is capable of displaying weather information in addition to guiding a travel route. For example, Japanese Unexamined Patent Application Publication No. 2003-148976 (JP 2003-148976 A) discloses a weather information display device that is mounted on a vehicle and acquires weather information of a point designated by a cursor, changes a shape of the cursor based on the acquired weather information, and displays the changed shape of the cursor on a map.

SUMMARY

By using a car navigation device or the like disclosed in JP 2003-148976 A, a user can refer to weather information on the travel route displayed on the map. However, in a case of displaying weather of the point designated by the user on the travel route, the weather of the position which is not necessarily a point intended by the user may be displayed. For example, in a case of a device having a touch panel such as a car navigation device, the weather information of the position which is not necessarily intended by the user may be displayed for reasons of a case where the position which is touched by the user slightly deviates from the travel route, a case where it is hard to touch accurately the point of which the user wants to know the weather information since a scale of the map is too small, or the like.

The present disclosure provides an information processing apparatus, an output method, and a non-transitory computer-readable recording medium storing a program that can provide weather information of a point according to a user's intention.

A first aspect of the present disclosure relates to an information processing apparatus including an in-vehicle device mounted on a vehicle. The in-vehicle device includes a display device and a processor. The in-vehicle device is configured to output, on the display device, weather information of a point designated by a user on a map, display a travel route along which the vehicle travels on the map of the display device, and in a case where the travel route is not included in an area including the point designated by the user on the map among a plurality of areas obtained by dividing the map and the processor determines that the point designated by the user is within a predetermined range from the travel route, output, on the display device, the weather information of an area closest to the point designated by the user among the areas including the travel route.

In the information processing apparatus according to the first aspect of the present disclosure, the in-vehicle device may be configured to output, on the display device, the weather information of the area including the point designated by the user in a case where the travel route is included in the area including the point designated by the user on the map or in a case where the travel route is not included in the area including the point designated by the user on the map and the processor determines that the point designated by the user is not within the predetermined range from the travel route.

In the information processing apparatus according to the aspect of the present disclosure, the in-vehicle device may be configured to determine that the point designated by the user is within the predetermined range from the travel route in a case where the point designated by the user is included in any one of enlarged areas which are on the travel route and are enlarged at a predetermined magnification with a center fixed and the point designated by the user is included in any one of the enlarged areas, and the in-vehicle device may be configured to determine that the point designated by the user is not within the predetermined range from the travel route in a case where the point designated by the user is not included in any one of the enlarged areas.

In the information processing apparatus according to the aspect of the present disclosure, the in-vehicle device may be configured to select the area including the point designated by the user among the enlarged areas as the area closest to the point designated by the user among the areas including the travel route.

In the information processing apparatus according to the aspect of the present disclosure, the in-vehicle device may be configured to select an area having a shortest distance among distances from respective centers of the enlarged areas to the point designated by the user as the area closest to the point designated by the user among the areas including the travel route in a case where a plurality of areas including the point designated by the user is present among the enlarged areas.

In the information processing apparatus according to the aspect of the present disclosure, the in-vehicle device may be configured to determine that the point designated by the user is within the predetermined range from the travel route in a case where one or more areas including the travel route are included in predetermined peripheral areas which have the area including the point designated by the user as a center and the in-vehicle device may be configured to determine that the point designated by the user is not within the predetermined range from the travel route in a case where the one or more areas including the travel route are not included in the predetermined peripheral areas which have the area including the point designated by the user as the center.

In the information processing apparatus according to the aspect of the present disclosure, the in-vehicle device may be configured to select the area having the shortest distance among distances from respective centers of the one or more areas to the point designated by the user, among the one or more areas including the travel route, as the area closest to the point designated by the user among the areas including the travel route in a case where the one or more areas including the travel route are included in the predetermined peripheral areas.

In the information processing apparatus according to the first aspect of the present disclosure, the in-vehicle device may be configured to output, on the display device, the weather information in accordance with a time slot during which the vehicle travels in the area in a case of outputting the weather information of the area including the point designated by the user, and the in-vehicle device may be configured to output, on the display device, the weather information in accordance with the time slot during which the vehicle travels in the area closest to the point designated by the user in a case of outputting the weather information of the area closest to the point designated by the user among the areas including the travel route.

A second aspect of the present disclosure relates to an output method of weather information. The output method is executed by an in-vehicle device which is mounted on a vehicle and includes a display device and a processor. The output method includes outputting, on the display device, weather information of a point designated by a user on a map by the in-vehicle device, displaying a travel route along which the vehicle travels on the map on the display device by the in-vehicle device, and in a case where the travel route is not included in an area including the point designated by the user on the map among a plurality of areas obtained by dividing the map and the processor determines that the point designated by the user is within a predetermined range from the travel route, outputting, on the display device, the weather information of an area closest to the point designated by the user among the areas including the travel route, by the in-vehicle device.

A third aspect of the present disclosure relates to a non-transitory computer-readable recording medium storing a program to execute an output method of weather information by an in-vehicle device which is mounted on a vehicle and includes a display device and a processor. The program causes a control process of the in-vehicle device to be executed. The control process includes outputting, on the display device, the weather information of a point designated by a user on a map, displaying a travel route along which the vehicle travels on the map on the display device, and in a case where the travel route is not included in the area including the point designated by the user on the map among a plurality of areas obtained by dividing the map and the processor determines that the point designated by the user is within a predetermined range from the travel route, outputting, on the display device, the weather information of an area closest to the point designated by the user among the areas including the travel route.

According to the aspects of the present disclosure, it is possible to provide the information processing apparatus, the output method, and the non-transitory computer-readable recording medium storing a program that can provide the weather information at the point according to the user's intention.

BRIEF DESCRIPTION OF THE DRAWINGS

Features, advantages, and technical and industrial significance of exemplary embodiments of the present disclosure will be described below with reference to the accompanying drawings, in which like numerals denote like elements, and wherein:

FIG. 8A is a diagram for describing a method of specifying a mesh area for acquiring weather information;

FIG. 8B is a diagram for describing the method of specifying the mesh area for acquiring the weather information; and FIG. 8C is a diagram for describing the method of specifying the mesh area for acquiring the weather information.

DETAILED DESCRIPTION

Figure 1:
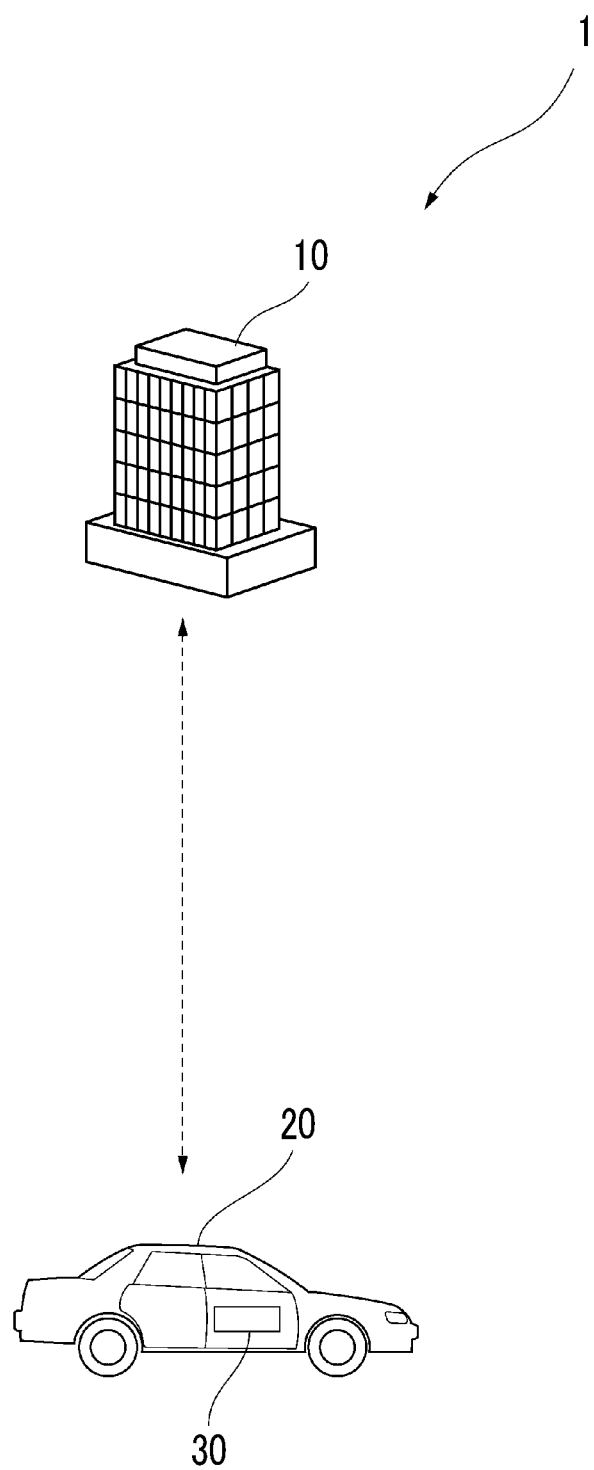
FIG. 1 is a diagram showing an example of a weather information providing system according to an embodiment.

Embodiments of the present disclosure will be described with reference to accompanying drawings. In the drawings, those denoted by the same reference numerals have the same or similar configuration.

FIG. 1 is a diagram showing an example of a weather information providing system 1 according to an embodiment. As shown in FIG. 1, the weather information providing system 1 includes a server 10 and a vehicle 20. Although FIG. 1 shows a single vehicle 20, the weather information providing system 1 may also include a plurality of vehicles 20. On the vehicle 20, an in-vehicle device 30 is mounted.

The server 10 is a device that provides weather information. The weather information is, for example, current or future weather (sunny, cloudy, rainy, snowy, and the like), temperature, humidity, precipitation amount, snowfall amount, and the like. The server 10 manages the weather information in association with each of a plurality of areas obtained by dividing a map (for example, a map of Japan all over the country) and has a function of transmitting the weather information to the in-vehicle device 30 in accordance with a request from the in-vehicle device 30. More specifically, the areas may be a plurality of mesh areas obtained by dividing the map into a predetermined size (for example, 500 m$^2$, 1 km$^2$, 2 km$^2$, or the like of an actual distance). Hereinafter, it is assumed that the areas are the mesh areas.

For the vehicle 20, any vehicle which is capable of mounting the in-vehicle device 30 may be used, for example, a vehicle such as a private car, a bus, and a truck and a motorcycle.

The in-vehicle device 30 is an information processing apparatus mounted on the vehicle, for example, a car navigation device, a smartphone having a navigation function, and a tablet terminal. Further, the in-vehicle device 30 has the navigation function of displaying a position of the vehicle 20 and a travel route along which the vehicle 20 travels on a map, and a function of outputting the weather information of a point designated by a user from a display or a speaker.

Here, in a case where the user wants to know the weather information of the point on the travel route, a point slightly deviating from the travel route may be designated depending on a situation such as a case of touching position in touch panel slightly deviates. Accordingly, in a case where a determination is made that a designated point slightly deviates from the travel route, the in-vehicle device 30 outputs the weather information on the travel route closest to the designated point instead of the weather information of the designated point. On the other hand, the user may intentionally designate a point different from the travel route when the user wants to know the weather information of any point which is not related to the travel route. In this case, when the weather information on the travel route is displayed, the weather information desired by the user is not displayed. Accordingly, in a case where the designated point greatly deviates from the travel route, the in-vehicle device 30 outputs the weather information of the designated point.

The in-vehicle device 30 may collectively download the weather information corresponding to the mesh areas (or all mesh areas) from the server 10 at the time of starting a vehicle engine, at the time of starting a route guidance, or the like and may store the weather information in a storage device (a memory or the like) included in the in-vehicle device 30. In this case, even in a case where the in-vehicle device 30 is not capable of communicating with the server 10, for example, in a tunnel or the like, it is possible to output the weather information. Further, the in-vehicle device 30 may acquire the weather information from the server 10 every time the weather information is output. In this case, it is possible to reduce an amount of communication data between the server 10 and the in-vehicle device 30.

Functional Block Configuration

Figure 2:
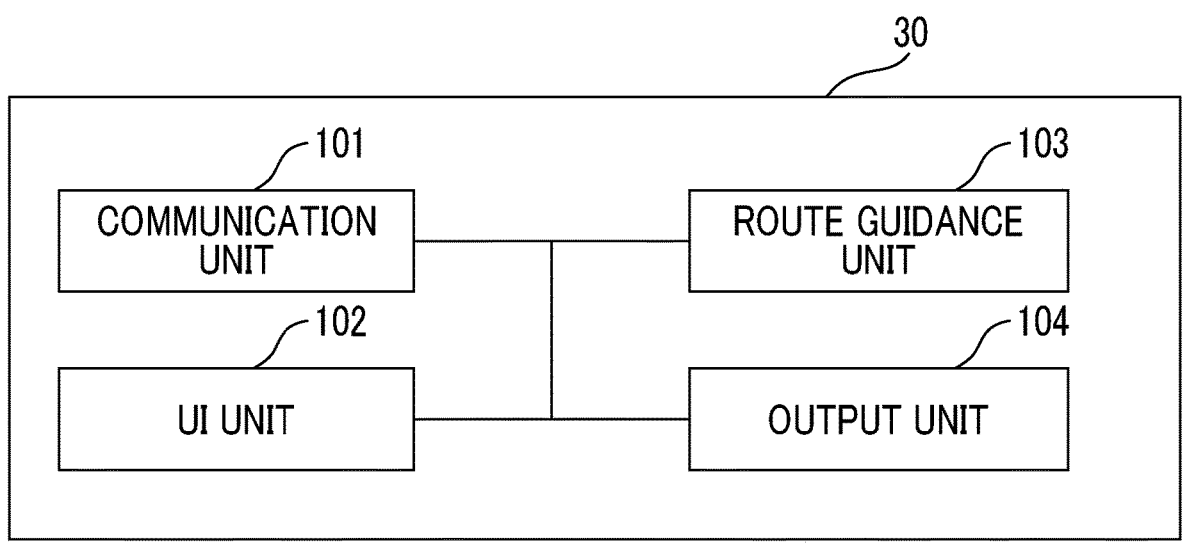
FIG. 2 is a diagram showing an example of a functional block configuration of an in-vehicle device.

FIG. 2 is a diagram showing an example of a functional block configuration of the in-vehicle device 30. The in-vehicle device 30 includes a communication unit 101, a user interface (UI) unit 102, a route guidance unit 103, and an output unit 104. The communication unit 101, the UI unit 102, the route guidance unit 103, and the output unit 104 are capable of being realized by a processor, central processing unit (CPU), included in the in-vehicle device 30 executing a program stored in the memory. Further, the program is capable of being stored in a recording medium. The recording medium storing the program may be a non-transitory recording medium. The non-transitory recording medium is not particularly limited, and may be a recording medium such as a universal serial bus (USB) memory or a compact disc read only memory (CD-ROM).

The communication unit 101 has a function of communicating with the server 10 via wireless communication such as a wireless local area network (LAN) and a mobile radio communication line.

The UI unit 102 has a function of displaying a screen such as a map on a display, a touch panel, or the like of the in-vehicle device 30 and a function of receiving an instruction of the user from a manipulation button, the touch panel, or the like of the in-vehicle device 30.

The route guidance unit 103 performs various kinds of processing needed for realizing the navigation function. For example, the route guidance unit 103 has a function of displaying the position of the vehicle 20 (a current position) and the travel route along which the vehicle 20 travels on the map displayed on the UI unit 102. A map data used for the navigation function includes information capable of specifying the same mesh area as the mesh areas for which the server 10 manages the weather information (an ID for uniquely specifying a mesh area, information indicating a range for each mesh area, or the like).

The output unit 104 has a function of acquiring and outputting the weather information at a point designated by the user from the server 10 or the storage device of the in-vehicle device 30 in a case where the point designated by the user is on the travel route. More specifically, in a case where the travel route is included in the mesh area including the point designated by the user on the map, the output unit 104 outputs the weather information corresponding to the mesh area including the point designated by the user. The output unit 104 may display a predetermined icon or a character corresponding to the weather information on the display or may output a sound for reading the weather information using the speaker.

Further, in a case where the point designated by the user slightly deviates from the travel route, the output unit 104 outputs the weather information corresponding to the mesh area closest to the point designated by the user among the mesh area including the travel route. More specifically, the output unit 104 outputs the weather information corresponding to the mesh area closest to the point designated by the user among the mesh areas including the travel route, in a case where the travel route is not included in the mesh area including the point designated by the user and a determination is made that the point designated by the user is within a predetermined range from the travel route.

Further, in a case where the point designated by the user greatly deviates from the travel route, the output unit 104 outputs the weather information corresponding to the mesh area including the point designated by the user. More specifically, the output unit 104 outputs the weather information corresponding to the mesh area including the point designated by the user in a case where the travel route is not included in the mesh area including the point designated by the user and the CPU determines that the point designated by the user is not within the predetermined range from the travel route.

The output unit 104 may output the weather information by displaying the weather information on a map screen displayed on the display or the touch panel included in the in-vehicle device 30 or may output the weather information by reading the weather information with voice or the like.

Processing Procedure

Figure 3:
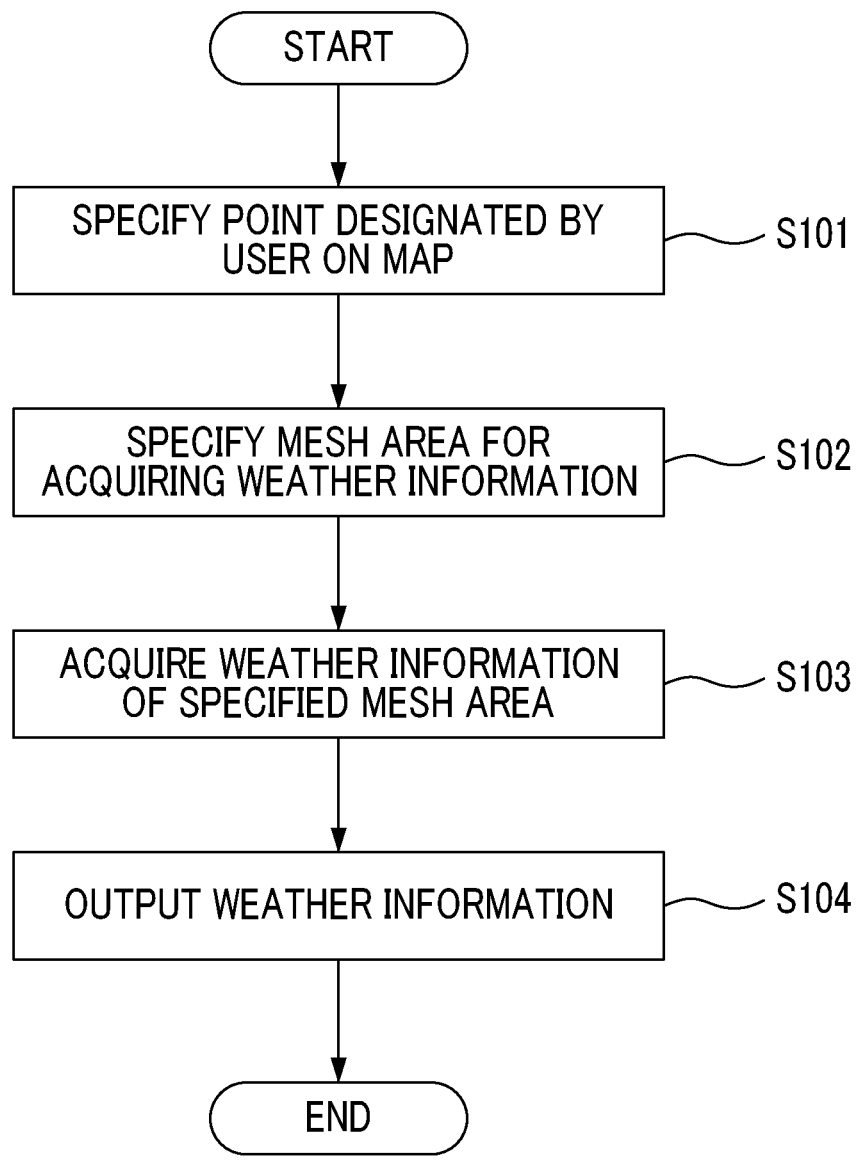
FIG. 3 is a flowchart showing an example of a processing procedure when the in-vehicle device acquires and outputs weather information.
Figure 4:
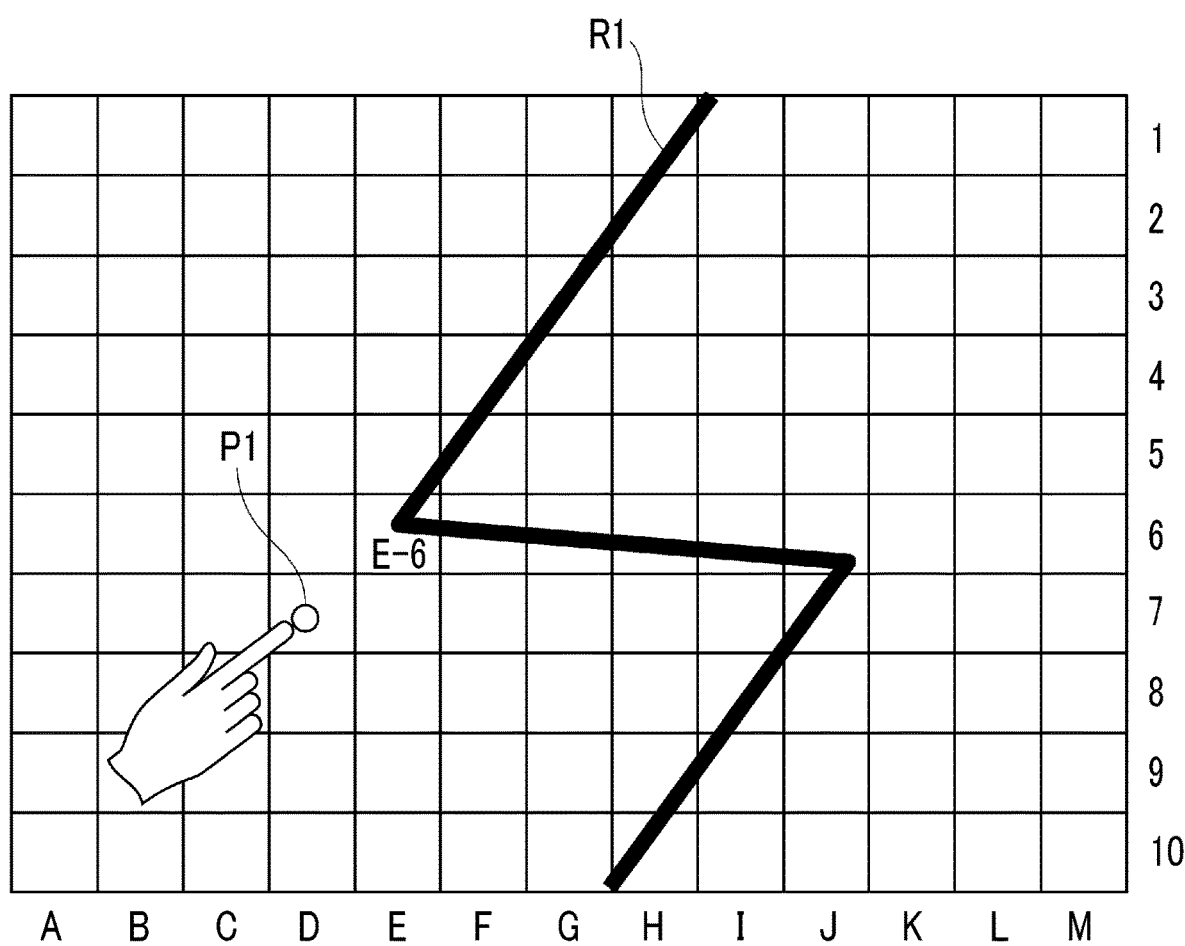
FIG. 4 is a diagram showing a specific example of a mesh area and a travel route on a map.

Subsequently, in a case where the user designates the point where the user wants to know the weather information, the processing procedure which is performed by the in-vehicle device 30 will be described. FIG. 3 is a flowchart showing an example of the processing procedure when the in-vehicle device 30 acquires and outputs the weather information. FIG. 4 is a diagram showing a specific example of the mesh area and the travel route on the map. In FIG. 4, an R1 shows an example of the travel route. In the following description, an assumption is made that the in-vehicle device 30 has started a route guidance of the travel route.

First, the output unit 104 specifies the point designated by the user on the map (S101). For example, when the user designates a point P1 in FIG. 4, the output unit 104 specifies the point P1 as the point designated by the user.

Subsequently, the output unit 104 specifies a mesh area for acquiring the weather information based on the point P1 designated by the user on the map (S102). In the example of FIG. 4, an assumption is made that the point P1 designated by the user is within a predetermined range from the travel route R1 (slightly deviates). In this case, the output unit 104 specifies a mesh area E-6 closest to the point designated by the user among the mesh areas including the travel route as the mesh area for acquiring the weather information.

Subsequently, the output unit 104 acquires the weather information of the mesh area specified in step S102 from the server 10 or the storage device included in the in-vehicle device 30 (S103). Subsequently, the output unit 104 outputs the weather information acquired in step S103 by displaying the weather information on the touch panel, reading out by voice, or the like (S104).

Next, the processing procedure when the output unit 104 specifies the mesh area for acquiring the weather information will be specifically described in step S102. The output unit 104 determines whether or not the point designated by the user on the map is included in any one of the mesh areas including the travel route. For example, in the example of FIG. 4, a determination is made whether or not the point P1 is included in any one of the mesh areas including the travel route (H-10, H-9, . . . , H-2, H-1, I-1). In a case where the point designated by the user on the map is included in any one of the mesh areas including the travel route, the output unit 104 specifies the mesh area as the mesh area for acquiring the weather information. On the other hand, in a case where the point designated by the user on the map is not included in any one of the mesh areas including the travel route, the output unit 104 further specifies the mesh area for acquiring the weather information by the following specific methods. The following description will be made assuming that an upper part of the mesh area shown in each diagram is in the north direction.

Specific Method 1

In a specific method 1, the output unit 104 specifies the mesh area for the acquiring weather information by using each area of the mesh areas on the travel route, of which the center is fixed (without changing the center) and which is enlarged at a predetermined magnification (hereinafter may be referred to as an "enlarged mesh area").

Specific Method 1-1

First, in a case where the point designated by the user on the map is included in any one of the enlarged mesh areas, the output unit 104 determines that the point designated by the user is within the predetermined range from the travel route (the point designated by the user slightly deviates from the travel route) and specifies the mesh area including the point designated by the user among a plurality of enlarged mesh areas as the mesh area for acquiring the weather information. That is, the output unit 104 treats the mesh area including the point designated by the user among the enlarged mesh areas as the mesh area closest to the point designated by the user among the mesh areas including the travel route.

Figure 5B:
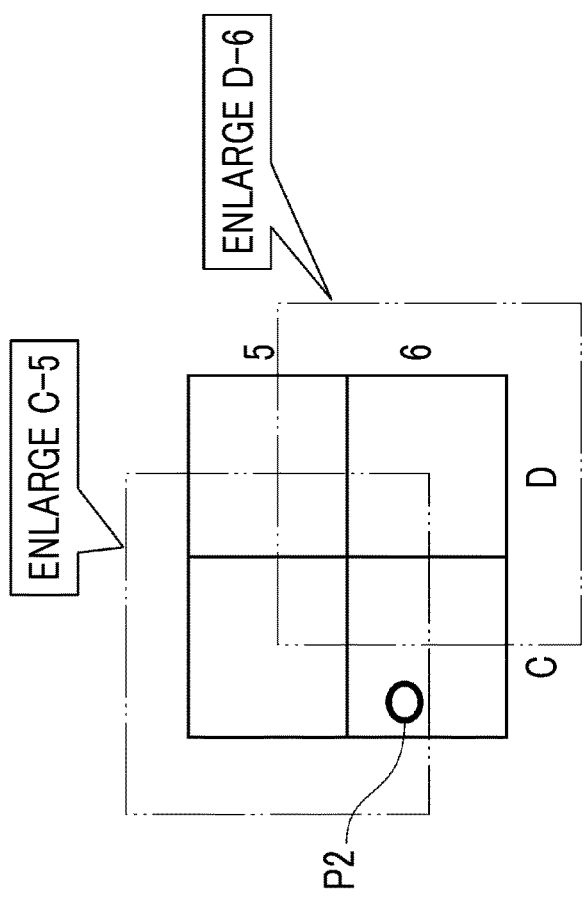
FIG. 5B is a diagram for describing the method of specifying the mesh area for acquiring the weather information.
Figure 5A:
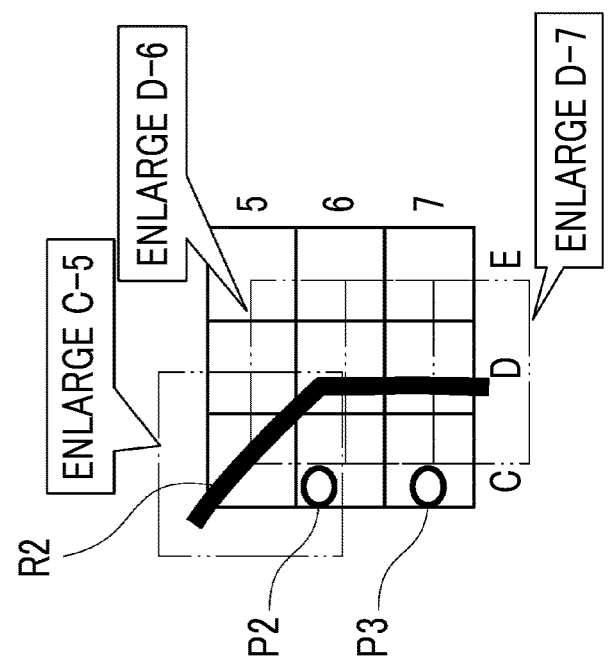
FIG. 5A is a diagram for describing a method of specifying a mesh area for acquiring weather information.

Specific examples are shown in FIGS. 5A and 5B. FIG. 5A shows an example in a case where a mesh area C-5, a mesh area D-6, and a mesh area D-7 on a travel route R2 are enlarged in a vertical direction and a horizontal direction at double magnification. FIG. 5B is an enlarged diagram of a part of FIG. 5A. For example, an assumption is made that the user designates a point P2. As shown in FIG. 5B, since the point P2 is included in the enlarged mesh area C-5, the output unit 104 specifies the mesh area C-5 as the mesh area for acquiring the weather information.

In addition, in a case where the point designated by the user on the map is not included in any one of the enlarged mesh areas, the output unit 104 determines that the point designated by the user is not within the predetermined range from the travel route (the point designated by the user greatly deviates from the travel route) and specifies the mesh area including the point designated by the user as the mesh area for acquiring the weather information. For example, as shown in FIG. 5A, an assumption is made that the user designates a point P3. In this case, since the point P3 is not included in any one of the enlarged mesh areas C-5, D-6, D-7, the output unit 104 specifies the mesh area C-7 including a point P3 designated by the user as the mesh area for acquiring the weather information.

Specific Method 1-2

In a case where a plurality of enlarged mesh areas including the point designated by the user on the map is present in the specific method 1-1, a method of specifying the mesh area from which the output unit 104 acquires the weather information will be described.

In this case, the output unit 104 specifies the mesh area having the shortest distance among distances from the respective centers of the enlarged mesh areas to the point designated by the user as the mesh area for acquiring the weather information. That is, the output unit 104 treats the mesh area having the shortest distance among the distances from the respective centers of the enlarged mesh areas to the point designated by the user as the mesh area closest to the point designated by the user among the mesh areas including the travel route.

Figure 6B:
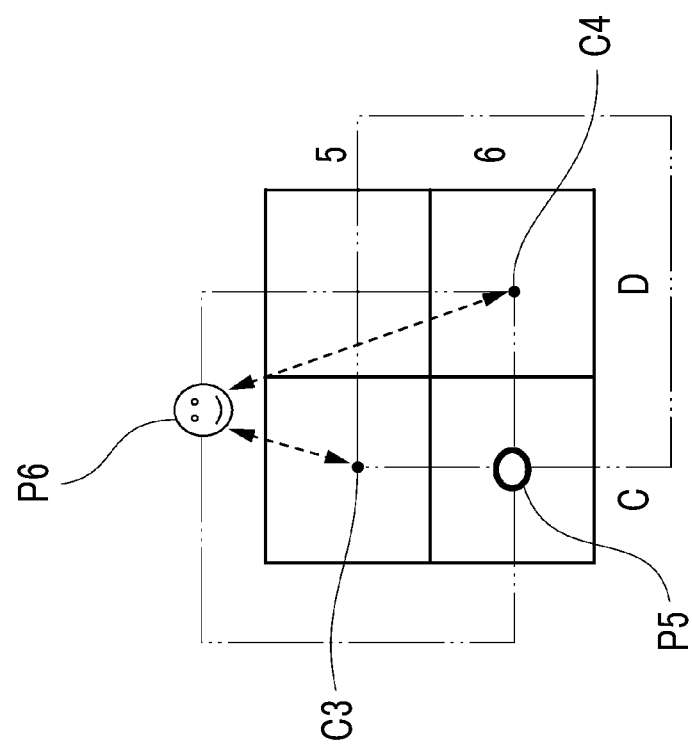
FIG. 6B is a diagram for describing the method of specifying the mesh area for acquiring the weather information.
Figure 6A:
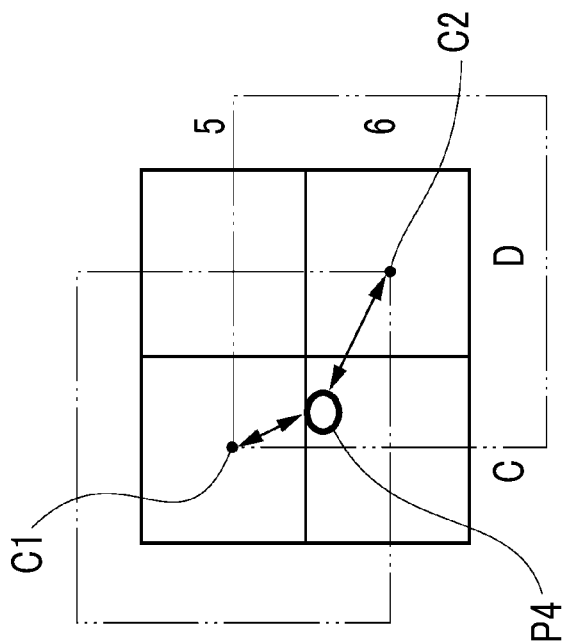
FIG. 6A is a diagram for describing a method of specifying a mesh area for acquiring weather information.

For example, an assumption is made that the user designates a point P4 as shown in FIG. 6A. In this case, the point P4 is included in both the enlarged mesh area C-5 and the mesh area D-6, and among the distances from the respective centers (C1, C2) of the mesh areas (C-5. D-6) to the point P4, the distance from the center C1 of the mesh area C-5 to the point P4 is closer. Accordingly, the output unit 104 specifies the mesh area C-5 as the mesh area for acquiring the weather information.

Specific Method 1-3

Next, in the specific method 1-2, in a case where the mesh areas having the shortest distance from the respective centers of the enlarged mesh areas to the point designated by the user is present, the method of specifying the mesh area from which the output unit 104 acquires the weather information will be described.

In this case, the output unit 104 specifies the mesh area having the shortest distance among distances from respective center points of the mesh areas having the shortest distance to the point designated by the user to a current point of the vehicle 20 as the mesh area for acquiring the weather information. That is, the output unit 104 treats the mesh area having the shortest distance among the distances from the respective center points of the enlarged mesh areas including the point designated by the user to the current point of the vehicle 20 as the mesh area closet to the point designated by the user among the mesh areas including the travel route.

For example, an assumption is made that the user designates a point P5 as shown in FIG. 6B. In this case, the point P5 is included in both of the enlarged mesh areas (C-5, D-6) and the distances from the respective centers (C3, C4) of the mesh areas (C-5, D-6) to the point P5 are the same. On the other hand, among the distances from the respective centers (C3, C4) of the mesh areas (C-5, D-6) to the current point P6 of the vehicle 20, the mesh area C-5 is closer. Accordingly, the output unit 104 specifies the mesh area C-5 as the mesh area for acquiring the weather information.

Specific Method 1-4

Next, in a case where the mesh areas having the shortest distance from the respective center points of the enlarged mesh areas including the point designated by the user to the current point of the vehicle 20 is present in the specific method 1-3, the method of specifying the mesh area from which the output unit 104 acquires the weather information will be described.

In this case, the output unit 104 specifies the mesh area on a west side among the enlarged mesh areas including the point designated by the user as the mesh area for acquiring the weather information. That is, the output unit 104 treats the mesh area on the west side among the enlarged mesh areas including the point designated by the user as the mesh area closest to the point designated by the user among the mesh areas including the travel route.

Figure 6D:
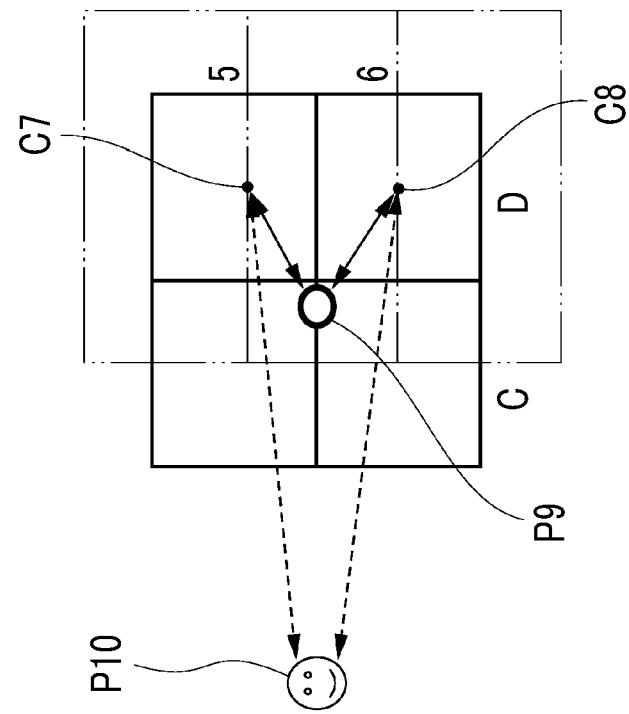
FIG. 6D is a diagram for describing the method of specifying the mesh area for acquiring the weather information.
Figure 6C:
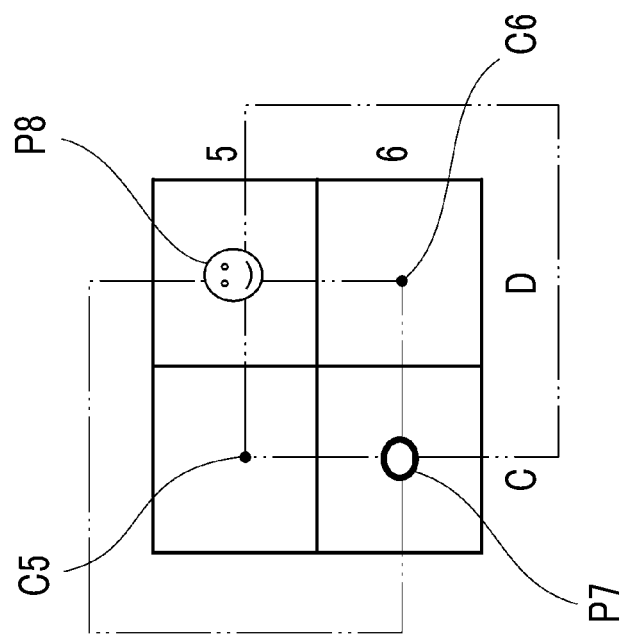
FIG. 6C is a diagram for describing the method of specifying the mesh area for acquiring the weather information.

For example, an assumption is made that the user designates a point P7 as shown in FIG. 6C. In this case, the point P7 is included in both the enlarged mesh areas (C-5, D-6) and the distances from the respective centers (C5, C6) of the mesh areas (C-5, D-6) to the point P7 are the same, and the distances from the respective centers (C5, C6) of the mesh areas (C-5, D-6) to a current point P8 of the vehicle 20 are the same. Accordingly, the output unit 104 specifies the mesh area C-5 which is the mesh area on the west side among the respective mesh area (C-5, D-6), as the mesh area for acquiring the weather information.

Specific Method 1-5

In a case where it is not possible to select the mesh area on the west side among the enlarged mesh areas including the point designated by the user among the enlarged mesh areas in the specific method 1-4, the method of specifying the mesh area from which the output unit 104 acquires the weather information will be described. In this case, the output unit 104 selects a mesh area on a south side among the enlarged mesh areas including the point designated by the user. That is, the output unit 104 treats the mesh area on the south side among the enlarged mesh areas including the point designated by the user as the mesh area closest to the point designated by the user in the mesh areas including the travel route.

For example, an assumption is made that the user designates a point P9 as shown in FIG. 6D. In this case, the point P9 is included in both the enlarged two mesh areas (D-5, D-6), the distances from the respective centers (C7, C8) of the mesh areas (D-5, D-6) to the point P9 are the same, and the distances from the respective centers (C7, C8) of the mesh areas (D-5. D-6) to a current point P10 of the vehicle 20 are the same. Further, since the mesh area D-5 and the mesh area D-6 are arranged in a north and a south directions side by side, the output unit 104 is not capable of selecting the mesh area on the west side. Accordingly, the output unit 104 specifies the mesh area D-6 which is the mesh area on the south side among the two mesh areas (D-5, D-6) as the mesh area for acquiring the weather information.

Specific Method 2

In the specific method 2, unlike the specific method 1, among mesh areas of periphery of the mesh area including the point designated by the user (hereinafter, referred to as a "peripheral mesh area" for convenience), the output unit 104 specifies the mesh area for acquiring the weather information based on a positional relationship between the peripheral mesh area including the travel route and the point designated by the user. Although the description is made assuming that the number of the peripheral mesh areas of periphery of the mesh area including the point designated by the user areas is eight, the number of the peripheral mesh areas is not limited to eight. The peripheral mesh areas may be 24 mesh areas further including mesh areas of periphery of the eight peripheral mesh areas or may further include mesh areas of periphery of the 24 peripheral mesh areas. That is, the number of "peripheries" of the peripheral mesh areas is not limited.

Specific Method 2-1

First, in a case where one or more peripheral mesh areas including the travel route are included in the peripheral mesh areas, the output unit 104 determines that the point designated by the user is within the predetermined range from the travel route (the point designated by the user slightly deviates from the travel route) and specifies a peripheral mesh area having the shortest distance among distances from the respective centers of the one or more peripheral mesh areas to the point designated by the user, among the one or more peripheral mesh areas including the travel route as the mesh area for acquiring the weather information. That is, the output unit 104 treats the peripheral mesh area having the shortest distance among distances from the respective centers of the one or more peripheral mesh areas including the travel route to the point designated by the user as the mesh area closest to the point designated by the user among the mesh areas including the travel route.

Figure 7A:
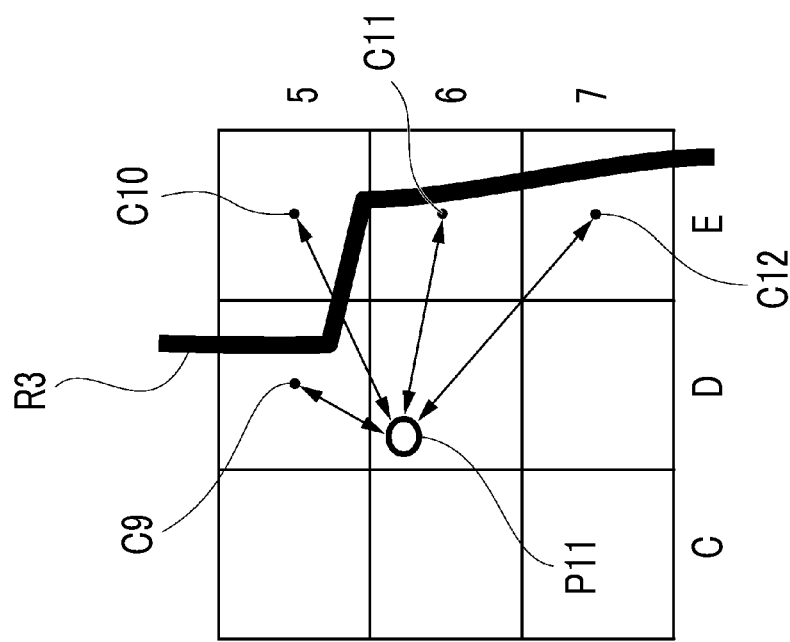
FIG. 7A is a diagram for describing a method of specifying a mesh area for acquiring weather information.

A specific example is shown in FIG. 7A. In FIG. 7A, among the peripheral mesh areas (C-5, C-6, C-7, D-5, D-7, E-5, E-6, E-7), the peripheral mesh areas including a travel route R3 are the peripheral mesh areas (D-5, E-5, E-6, E-7). In this case, the output unit 104 specifies the peripheral mesh areas D-5 having the shortest distance among distances from the respective centers of the peripheral mesh areas (C9, C10, C11, C12) to a point P11 designated by the user as the mesh area for acquiring the weather information.

Figure 7B:
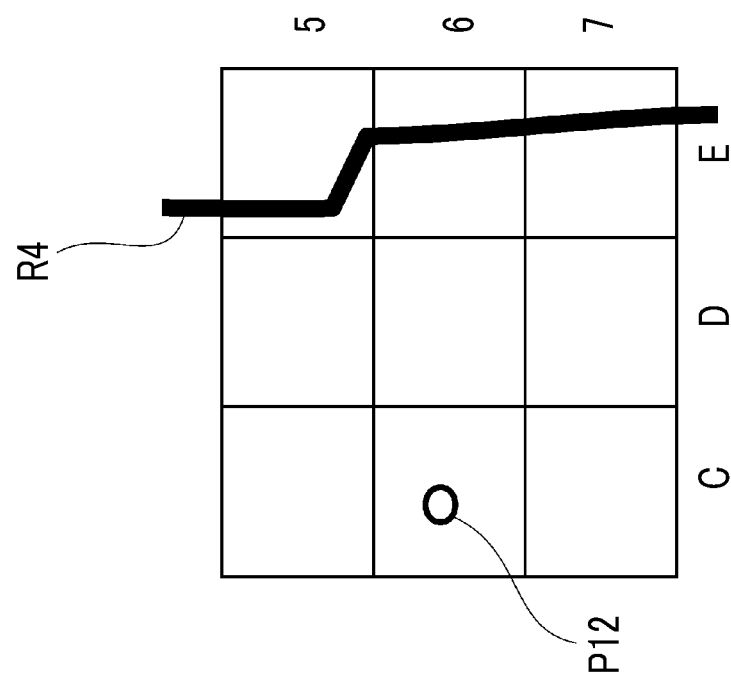
FIG. 7B is a diagram for describing the method of specifying the mesh area for acquiring the weather information.

Further, in a case where the one or more peripheral mesh areas including the travel route are not included among the peripheral mesh areas, the output unit 104 determines that the point designated by the user is not within the predetermined range from the travel route (the point designated by the user greatly deviates from the travel route) and specifies the mesh area including the point designated by the user as the mesh area for acquiring the weather information. For example, as shown in FIG. 7B, an assumption is made that the user designates a point P12. In this case, among the peripheral mesh areas (C-5, C-7, D-5, D-6, D-7), there is no peripheral mesh area including a travel route R4. Accordingly, the output unit 104 specifies the mesh area C-6 including the point P12 designated by the user as the mesh area for acquiring the weather information.

Specific Method 2-2

Next, in the specific method 2-1, in a case where a plurality of peripheral mesh areas having the shortest distance from the respective centers of the peripheral mesh areas including the travel route to the point designated by the user is present, the method of specifying the mesh area from which the output unit 104 acquires the weather information will be described. In this case, the output unit 104 specifies the peripheral mesh area having the shortest distance between the center point of each of the peripheral mesh areas and the current point of the vehicle 20 as the mesh area for acquiring the weather information. That is, the output unit 104 treats the peripheral mesh area having the shortest distance between the center point of each of the peripheral mesh areas and the current point of the vehicle 20 as the mesh area closest from the point designated by the user among the mesh areas including the travel route.

For example, an assumption is made that the user designates a point P13 as shown in FIG. 8A. In this case, the distance from the centers (C13, C14) of the peripheral mesh areas (C-5, D-6) including the travel route R5 which are predetermined peripheral mesh areas having the peripheral mesh area including the point P13 designated by the user as the center to the point P13 is the same. Therefore, the output unit 104 specifies the peripheral mesh area C-5 having a shorter distance between the centers (C13, C14) and the current point P14 of the vehicle 20 among the two peripheral mesh areas (C-5, D-6) as the mesh area for acquiring the weather information.

Specific Method 2-3

Next, in the specific method 2-3, in a case where the peripheral mesh areas having the shortest distance between the respective center points of the peripheral mesh areas and the current point of the vehicle 20 is present, the method of specifying a mesh area from which the output unit 104 acquires weather information will be described. In this case, the output unit 104 specifies the peripheral mesh area through which the vehicle 20 passes at the first in the travel route among the peripheral mesh areas having the shortest distance between the respective center points of the peripheral mesh areas and the current point of the vehicle 20 as the mesh area for acquiring the weather information. That is, in a case where the peripheral mesh areas having the shortest distance between the respective center points of the peripheral mesh areas and the current point of the vehicle 20 is present, the output unit 104 treats the peripheral mesh area through which the vehicle 20 passes at the first in the travel route as the mesh area closest from the point designated by the user among the mesh areas including the travel route.

For example, an assumption is made that the user designates a point P15 as shown in FIG. 8B. In this case, the distance between the centers (C15, C16) of the peripheral mesh areas (C-5, D-6) including a travel route R6 and the point P15 are the same, furthermore, the distance between the centers (C15, C16) of the peripheral mesh areas (C-5, D-6) and the current point P16 of the vehicle 20 is also the same. Accordingly, the output unit 104 specifies the peripheral mesh area D-6 through which the vehicle 20 passes at the first among the peripheral mesh area C-5 and the peripheral mesh area D-6 as the mesh area for acquiring the weather information.

Specific Method 2-4

In the specific method 2-3, the output unit 104 may specify the peripheral mesh area on the west side as the mesh area for acquiring the weather information instead of the peripheral mesh area through which the vehicle 20 passes at the first in the travel route. For example, as shown in FIG. 8B, the output unit 104 may specify the peripheral mesh area C-5 as the mesh area for acquiring the weather information.

Specific Method 2-5

In a case where it is not possible to select the peripheral mesh area on the west side in the specific method 2-4, the output unit 104 may select the peripheral mesh area on the south side. For example, an assumption is made that the user designates a point P17 as shown in FIG. 8C. In this case, the distance between the centers (C17, C18) of the peripheral mesh areas (D-5, D-6) and the point P17 are the same, further, the distances between the centers (C17, C18) of the peripheral mesh areas (D-5, D-6) and the current point P18 of the vehicle 20 are also the same. Further, since the peripheral mesh areas (D-5, D-6) are arranged in the north-south direction side by side, the output unit 104 is not capable of selecting the peripheral mesh area on the west side. Accordingly, the output unit 104 specifies the peripheral mesh area D-6 on the south side among the peripheral mesh areas (D-5, D-6) as the mesh area for acquiring the weather information.

Modification Example

The output unit 104 may output the weather information in accordance with the time slot during which the vehicle 20 travels in the mesh area in a case where the output unit 104 outputs the weather information of the mesh area including the point designated by the user. For example, as shown in FIG. 4, an assumption is made that the user designates a point in the mesh area E-6 and the output unit 104 outputs the weather information of the mesh area E-6. In this case, the output unit 104 may output the weather information in accordance with the time slot during which the vehicle 20 travels in the mesh area E-6 including the travel route R1 among the weather information for each time in the mesh area E-6.

Further, the output unit 104 may output the weather information in accordance with the time slot during which the vehicle 20 travels in the mesh area closest from the point designated by the user in a case where the output unit 104 outputs the weather information of the mesh area closest from the point designated by the user among the mesh areas including the travel route. For example, as shown in FIG. 4, an assumption is made that the user designates a point in the mesh area D-7 and the output unit 104 outputs the weather information of the mesh area E-6 closest to the point of the mesh area D-7. In this case, the output unit 104 may output the weather information in accordance with the time slot during which the vehicle 20 travels in the mesh area E-6 including the travel route R1 among the weather information for each time in the mesh area E-6.

An order of the specific methods described in the specific method 1-4 and the specific method 1-5 may be changed. That is, the output unit 104 may specify the mesh area on the south side among the enlarged mesh areas including the point designated by the user as the mesh area for acquiring the weather information and may select the mesh area on the west side in a case where it is not possible to select the mesh area on the south side. Likewise, an order of the specific methods described in the specific method 2-4 and the specific method 2-5 may be changed. That is, the output unit 104 may specify the peripheral mesh area on the south side among the peripheral mesh areas including the travel route as the mesh area for acquiring the weather information and may select the peripheral mesh area on the west side in a case where it is not possible to select the peripheral mesh area on the south side.

The above-described embodiments are for facilitating understanding of a gist of the present disclosure and are not intended to limit the gist of the present disclosure. The flowchart and sequence described in the embodiments, the arrangement, material, condition, shape, size, and the like of each element included in the embodiments are not limited to those exemplified and can be appropriately modified. In addition, it is possible to partially replace or combine the configurations shown in the embodiments which are different from each other.

What is claimed is:

1. An information processing apparatus comprising an in-vehicle device mounted on a vehicle, the in-vehicle device including a display device and a processor, wherein the in-vehicle device is configured to divide a map into a plurality of areas such that a plurality of mesh areas within the map are formed, receive, from the display device that is touch enabled, a point designated by a user on the map displayed on the display device, specify a mesh area of the plurality of mesh areas for acquiring weather information based on the point, the mesh area including the point designated by the user on the map, output, on the display device, weather information of the point designated by the user on the map, display a travel route along which the vehicle travels on the map of the display device, determine whether the point designated by the user is within a predetermined range from the travel route, and in a case where the travel route is not included in the mesh area including the point designated by the user on the map among the plurality of areas obtained by dividing the map and the processor determines that the point designated by the user is within the predetermined range from the travel route, output, on the display device, the weather information of a mesh area closest to the point designated by the user among the plurality of mesh areas including the travel route.

2. The information processing apparatus according to claim 1, wherein the in-vehicle device is configured to output, on the display device, the weather information of the mesh area including the point designated by the user in a case where the travel route is included in the mesh area including the point designated by the user on the map or in a case where the travel route is not included in the mesh area including the point designated by the user on the map and the processor determines that the point designated by the user is not within the predetermined range from the travel route.

3. The information processing apparatus according to claim 2, wherein the in-vehicle device is configured to
determine that the point designated by the user is within the predetermined range from the travel route in a case where the point designated by the user is included in any one of enlarged mesh areas which are on the travel route and are enlarged at a predetermined magnification with a center fixed and the point designated by the user is included in any one of the enlarged mesh areas, and
determine that the point designated by the user is not within the predetermined range from the travel route in a case where the point designated by the user is not included in any one of the enlarged mesh areas.

4. The information processing apparatus according to claim 3, wherein the in-vehicle device is configured to select the mesh area including the point designated by the user among the enlarged mesh areas as the mesh area closest to the point designated by the user among the plurality of mesh areas including the travel route.

5. The information processing apparatus according to claim 4, wherein the in-vehicle device is configured to select a mesh area having a shortest distance among distances from respective centers of the enlarged mesh areas to the point designated by the user as the mesh area closest to the point designated by the user among the plurality of mesh areas including the travel route in a case where a plurality of mesh areas including the point designated by the user is present among the enlarged mesh areas.

6. The information processing apparatus according to claim 2, wherein:
the in-vehicle device is configured to determine that the point designated by the user is within the predetermined range from the travel route in a case where one or more mesh areas including the travel route are included in predetermined peripheral mesh areas which have the mesh area including the point designated by the user as a center; and
the in-vehicle device is configured to determine that the point designated by the user is not within the predetermined range from the travel route in a case where the one or more mesh areas including the travel route are not included in the predetermined peripheral mesh areas which have the mesh area including the point designated by the user as the center.

7. The information processing apparatus according to claim 6, wherein the in-vehicle device is configured to select the mesh area having a shortest distance among distances from respective centers of the one or more mesh areas to the point designated by the user, among the one or more mesh areas including the travel route, as the mesh area closest to the point designated by the user among the plurality of mesh areas including the travel route in a case where the one or more mesh areas including the travel route are included in the predetermined peripheral mesh areas.

8. The information processing apparatus according to claim 1, wherein:
the in-vehicle device is configured to output, on the display device, the weather information in accordance with a time slot during which the vehicle travels in the mesh area in a case of outputting the weather information of the mesh area including the point designated by the user; and
the in-vehicle device is configured to output, on the display device, the weather information in accordance with the time slot during which the vehicle travels in the mesh area closest to the point designated by the user in a case of outputting the weather information of the mesh area closest to the point designated by the user among the plurality of mesh areas including the travel route.

9. An output method of weather information, the output method being executed by an in-vehicle device which is mounted on a vehicle and includes a display device and a processor, the output method comprising:
dividing a map into a plurality of areas such that a plurality of mesh areas within the map are formed;
receiving, from the display device that is touch enabled, a point designated by a user on the map displayed on the display device;
specifying a mesh area of the plurality of mesh areas for acquiring weather information based on the point, the mesh area including the point designated by the user on the map;
outputting, on the display device, weather information of the point designated by the user on the map by the in-vehicle device;
displaying a travel route along which the vehicle travels on the map on the display device by the in-vehicle device;
determining whether the point designated by the user is within a predetermined range from the travel route; and
in a case where the travel route is not included in the mesh area including the point designated by the user on the map among the plurality of areas obtained by dividing the map and the processor determines that the point designated by the user is within the predetermined range from the travel route, outputting, on the display device, the weather information of a mesh area closest to the point designated by the user among the plurality of mesh areas including the travel route, by the in-vehicle device.

10. A non-transitory computer-readable recording medium storing a program to execute an output method of weather information by an in-vehicle device which is mounted on a vehicle and includes a display device and a processor, the program causing a control process of the in-vehicle device to be executed, the control process comprising:
dividing a map into a plurality of areas such that a plurality of mesh areas within the map are formed;
receiving, from the display device that is touch enabled, a point designated by a user on the map displayed on the display device;
specifying a mesh area of the plurality of mesh areas for acquiring weather information based on the point, the mesh area including the point designated by the user on the map;
outputting, on the display device, the weather information of the point designated by the user on the map;
displaying a travel route along which the vehicle travels on the map on the display device;
determining whether the point designated by the user is within a predetermined range from the travel route; and
in a case where the travel route is not included in the mesh area including the point designated by the user on the map among the plurality of areas obtained by dividing the map and the processor determines that the point designated by the user is within the predetermined range from the travel route, outputting, on the display device, the weather information of a mesh area closest to the point designated by the user among the plurality of mesh areas including the travel route.

* * * * *